United States Patent [19]

Aranda et al.

[11] Patent Number: 4,878,182
[45] Date of Patent: Oct. 31, 1989

[54] MULTIPLE PIXEL GENERATOR

[75] Inventors: Michael A. Aranda, Saugerties; Timothy J. Ebbers, Shokan; Yoshio Iida, Lake Katrine; Terence W. Lindgren, Rosendale; Taggart H. Robertson, Earlton, all of N.Y.

[73] Assignee: International Business Machines Corporation, Armonk, N.Y.

[21] Appl. No.: 115,451

[22] Filed: Oct. 30, 1987

[51] Int. Cl.$^4$ ............................................. G06F 15/40
[52] U.S. Cl. ................................. 364/518; 340/728; 340/744
[58] Field of Search ............... 340/724, 728, 744, 747, 340/723; 364/518, 521, 522, 720

[56] References Cited

U.S. PATENT DOCUMENTS

| | | | |
|---|---|---|---|
| 4,586,037 | 4/1986 | Rosener et al. | 340/728 |
| 4,623,880 | 11/1986 | Bresenham et al. | 340/744 X |
| 4,626,838 | 12/1986 | Tsujioka et al. | 340/744 |
| 4,736,201 | 4/1988 | Nakayama et al. | 340/728 X |
| 4,736,330 | 4/1988 | Capowski | 340/724 X |
| 4,737,921 | 4/1988 | Goldwasser et al. | 340/747 X |
| 4,742,343 | 5/1988 | O'Donnell | 340/728 X |

OTHER PUBLICATIONS

Foley, J. D. et al., *Fundamentals of Interactive Computer Graphics*, Addison—Wesley Publishing Co., Inc., pp. 431–436, (1982).

Sproull, R. F., "Using Program Transformations to Derive Line—Drawing Algorithms," *ACM Transactions on Computer Graphics*, vol. 1, No. 4, pp. 259–273, (Oct. 1982).

Primary Examiner—A. D. Pellinen
Assistant Examiner—A. Jonathan Wysocki
Attorney, Agent, or Firm—Mark S. Walker; J. Dennis Moore

[57] ABSTRACT

A system for generating multiple pixels in a single machine cycle employs a plurality of parallel vector generators. Each of the parallel generators is initialized with an error term which is calcualted in accordance with Bresenham's algorithm. The signs of these error terms are then used to determine the region within the first octant of the coordinate system which contains the function for which the pixels are to be generated. The region data, in turn, determine two selectable values for an increment which is to be added to a running error term for each of the parallel generators as multiple pixels are simultaneously generated. The choice of the two possible values to be added to the error term is dependent upon the sign of the error term itself. The sign of the running error term for each vector generator is utilized to form a sequence of binary data which represents the incremental changes in the pixel positions as the pixels are being generated. In a preferred embodiment, the binary data is translated into pixel position data which is then stored in a memory device. Any generated pixel data which cannot be stored in the machine cycle in which it is generated is re-routed for storage in later cycles.

33 Claims, 15 Drawing Sheets

FIG.5
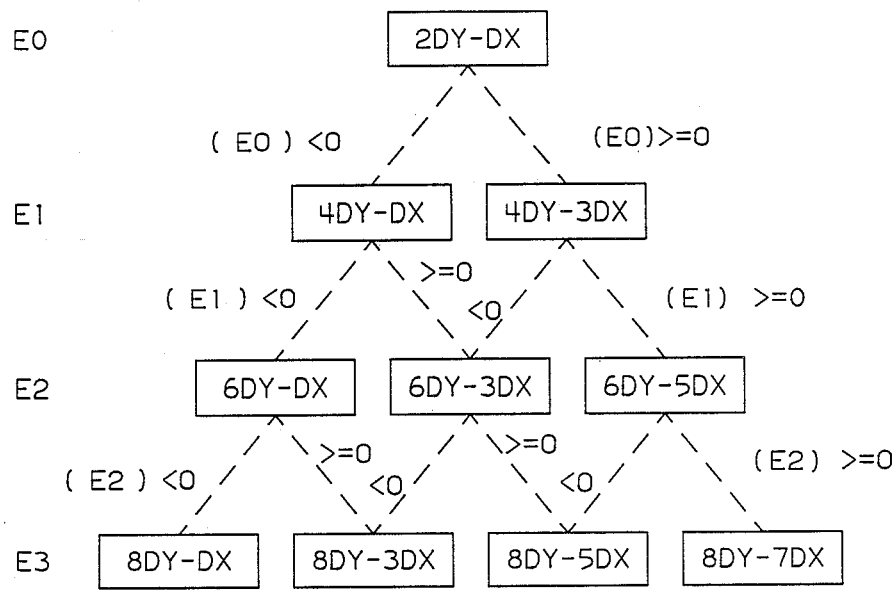
FIG.7
| REGION | d | f | INC 1 | INC 2 |
|--------|---|---|-------|-------|
| 3 | 0 | 0 | 4(2dy-2dx) | 2E1 |
| 2 | 0 | 1 | 2E1 | 4E0 |
| 1 | 1 | 0 | 4E0 | 2E1 |
| 0 | 1 | 1 | 2E1 | 4(2dy) |
FIG.8
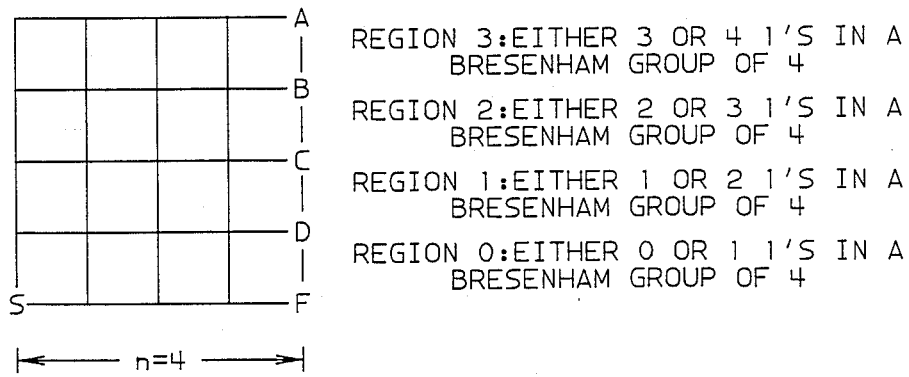
REGION 3: EITHER 3 OR 4 1'S IN A BRESENHAM GROUP OF 4
REGION 2: EITHER 2 OR 3 1'S IN A BRESENHAM GROUP OF 4
REGION 1: EITHER 1 OR 2 1'S IN A BRESENHAM GROUP OF 4
REGION 0: EITHER 0 OR 1 1'S IN A BRESENHAM GROUP OF 4

FIG. 9

REGION 0

| H3 | H2 | H1 | S0 | b0 |
|----|----|----|----|----|
| 0 | 0 | 0 | 0 | 1 |
| 0 | 0 | 0 | 1 | 0 |
| 0 | 0 | 1 | 0 | 0 |
| 0 | 0 | 1 | 1 | D |
| 0 | 1 | 0 | 0 | 0 |
| 0 | 1 | 0 | 1 | D |
| 0 | 1 | 1 | 0 | D |
| 0 | 1 | 1 | 1 | D |
| 1 | 0 | 0 | 0 | 0 |
| 1 | 0 | 0 | 1 | D |
| 1 | 0 | 1 | 0 | D |
| 1 | 0 | 1 | 1 | D |
| 1 | 1 | 0 | 0 | D |
| 1 | 1 | 0 | 1 | D |
| 1 | 1 | 1 | 0 | D |
| 1 | 1 | 1 | 1 | D |

REGION 1

| H3 | H2 | H1 | S0 | c0 |
|----|----|----|----|----|
| 0 | 0 | 0 | 0 | D |
| 0 | 0 | 0 | 1 | 1 |
| 0 | 0 | 1 | 0 | 1 |
| 0 | 0 | 1 | 1 | 0 |
| 0 | 1 | 0 | 0 | 1 |
| 0 | 1 | 0 | 1 | 0 |
| 0 | 1 | 1 | 0 | 0 |
| 0 | 1 | 1 | 1 | D |
| 1 | 0 | 0 | 0 | 1 |
| 1 | 0 | 0 | 1 | 0 |
| 1 | 0 | 1 | 0 | 0 |
| 1 | 0 | 1 | 1 | D |
| 1 | 1 | 0 | 0 | 0 |
| 1 | 1 | 0 | 1 | D |
| 1 | 1 | 1 | 0 | D |
| 1 | 1 | 1 | 1 | D |

REGION 2

| H3 | H2 | H1 | S0 | d0 |
|----|----|----|----|----|
| 0 | 0 | 0 | 0 | D |
| 0 | 0 | 0 | 1 | D |
| 0 | 0 | 1 | 0 | D |
| 0 | 0 | 1 | 1 | 1 |
| 0 | 1 | 0 | 0 | D |
| 0 | 1 | 0 | 1 | 1 |
| 0 | 1 | 1 | 0 | 1 |
| 0 | 1 | 1 | 1 | 0 |
| 1 | 0 | 0 | 0 | D |
| 1 | 0 | 0 | 1 | 1 |
| 1 | 0 | 1 | 0 | 1 |
| 1 | 0 | 1 | 1 | 0 |
| 1 | 1 | 0 | 0 | 1 |
| 1 | 1 | 0 | 1 | 0 |
| 1 | 1 | 1 | 0 | 0 |
| 1 | 1 | 1 | 1 | D |

REGION 3

| H3 | H2 | H1 | S0 | e0 |
|----|----|----|----|----|
| 0 | 0 | 0 | 0 | D |
| 0 | 0 | 0 | 1 | D |
| 0 | 0 | 1 | 0 | D |
| 0 | 0 | 1 | 1 | D |
| 0 | 1 | 0 | 0 | D |
| 0 | 1 | 0 | 1 | D |
| 0 | 1 | 1 | 0 | D |
| 0 | 1 | 1 | 1 | 1 |
| 1 | 0 | 0 | 0 | D |
| 1 | 0 | 0 | 1 | D |
| 1 | 0 | 1 | 0 | D |
| 1 | 0 | 1 | 1 | 1 |
| 1 | 1 | 0 | 0 | D |
| 1 | 1 | 0 | 1 | 1 |
| 1 | 1 | 1 | 0 | 1 |
| 1 | 1 | 1 | 1 | 0 |

FIG. 10

REGION 0

|  H3 H2 | H1 S0<br>00 | 01 | 11 | 10 |
|---|---|---|---|---|
| 00 | 1 | 0 | D | 0 |
| 01 | 0 | D | D | D |
| 11 | D | D | D | D |
| 10 | 0 | D | D | D |

REGION 1

| H3 H2 | H1 S0<br>00 | 01 | 11 | 10 |
|---|---|---|---|---|
| 00 | D | 1 | 0 | D |
| 01 | 1 | 0 | D | D |
| 11 | D | D | D | D |
| 10 | 1 | 0 | D | 0 |

REGION 2

| H3 H2 | H1 S0<br>00 | 01 | 11 | 10 |
|---|---|---|---|---|
| 00 | D | D | D | D |
| 01 | D | 1 | 0 | 1 |
| 11 | 1 | D | D | 0 |
| 10 | D | D | 0 | 1 |

REGION 3

| H3 H2 | H1 S0<br>00 | 01 | 11 | 10 |
|---|---|---|---|---|
| 00 | D | D | D | D |
| 01 | D | D | 1 | D |
| 11 | D | 1 | 0 | 1 |
| 10 | D | D | 1 | D |

REGION 0

REGION 1

| PIXEL RATE | NEXT E0 | NEXT E1 | NEXT E2 | NEXT E3 |
|---|---|---|---|---|
| 4 | E0 | E1 | E2 | E3 |
| 3 | OLD E3 | E0 | E1 | E2 |
| 2 | OLD E2 | OLD E3 | E0 | E1 |
| 1 | OLD E1 | OLD E2 | OLD E3 | E0 |

| PIXEL RATE | NEXT H3 | NEXT H2 | NEXT H1 |
|---|---|---|---|
| 4 | P1 | P2 | P3 |
| 3 | P0 | P1 | P2 |
| 2 | OLD H1 | P0 | P1 |
| 1 | OLD H2 | OLD H1 | P0 |

FIG. 14

| POINTER | S0 | S1 | S2 | S3 |
|---|---|---|---|---|
| 0 | VG #0 | VG #1 | VG #2 | VG #3 |
| 1 | VG #1 | VG #2 | VG #3 | VG #0 |
| 2 | VG #2 | VG #3 | VG #0 | VG #1 |
| 3 | VG #3 | VG #0 | VG #1 | VG #2 |

FIG. 15 (a)

| PIXEL RATE | NEXT E0 FROM | NEXT E1 FROM | NEXT E2 FROM | NEXT E3 FROM | NEXT POINTER |
|---|---|---|---|---|---|
| 4 | VG #0 | VG #1 | VG #2 | VG #3 | 0 |
| 3 | OLD E3 | VG #0 | VG #1 | VG #2 | 3 |
| 2 | OLD E2 | OLD E3 | VG #0 | VG #1 | 2 |
| 1 | OLD E1 | OLD E2 | OLD E3 | VG #0 | 1 |

POINTER=0

FIG. 15 (b)

| PIXEL RATE | NEXT E0 FROM | NEXT E1 FROM | NEXT E2 FROM | NEXT E3 FROM | NEXT POINTER |
|---|---|---|---|---|---|
| 4 | VG #1 | VG #2 | VG #3 | VG #0 | 1 |
| 3 | OLD E3 | VG #1 | VG #2 | VG #3 | 0 |
| 2 | OLD E2 | OLD E3 | VG #1 | VG #2 | 3 |
| 1 | OLD E1 | OLD E2 | OLD E3 | VG #1 | 2 |

POINTER=1

FIG. 15 (c)

| PIXEL RATE | NEXT E0 FROM | NEXT E1 FROM | NEXT E2 FROM | NEXT E3 FROM | NEXT POINTER |
|---|---|---|---|---|---|
| 4 | VG #2 | VG #3 | VG #0 | VG #1 | 2 |
| 3 | OLD E3 | VG #2 | VG #3 | VG #0 | 1 |
| 2 | OLD E2 | OLD E3 | VG #2 | VG #3 | 0 |
| 1 | OLD E1 | OLD E2 | OLD E3 | VG #2 | 3 |

POINTER=2

FIG. 15 (d)

| PIXEL RATE | NEXT E0 FROM | NEXT E1 FROM | NEXT E2 FROM | NEXT E3 FROM | NEXT POINTER |
|---|---|---|---|---|---|
| 4 | VG #3 | VG #0 | VG #1 | VG #2 | 3 |
| 3 | OLD E3 | VG #3 | VG #0 | VG #1 | 2 |
| 2 | OLD E2 | OLD E3 | VG #3 | VG #0 | 1 |
| 1 | OLD E1 | OLD E2 | OLD E3 | VG #3 | 0 |

POINTER=3

MULTIPLE PIXEL GENERATOR

FIELD OF THE INVENTION

This invention relates to mapping continuous linear functions onto a two dimensional grid. More particularly, it relates to determining the grid locations for a raster display by employing a method and apparatus which generates multiple pixel locations during a single machine cycle.

BACKGROUND OF THE INVENTION

In a number of situations a given parameter y, which is a continuous linear function of a first parameter x, must be represented by choosing discrete locations in a two dimensional grid of possible x and y values. Each point of the grid is located at the intersection of the x and y values associated with that grid point. The grid points thus formed are often referred to as "picture elements" or "pixels". In order to most accurately map a continuous linear function onto this type of two dimensional grid, the pixels chosen to represent the function must be those which are located closest to the true x and y values for the function.

A common example of this type of mapping problem is representing a continuous line on a two dimensional raster grid. In order to do so, the x and y coordinates of the pixels located closest to the true line must be determined, where x and y have integer values. The algorithms used to determine the pixel coordinates are often referred to as scan-conversion algorithms. Typically, the pixel coordinates determined by the algorithm are stored in memory devices at addresses which correspond to the raster grid locations. Conventional raster scan display techniques may then be utilized to display the resulting line by scanning the memory and by illuminating the pixel locations stored therein.

In a typical raster display, the scan-conversion algorithm employed will be invoked quite frequently, possibly as often as hundreds or even thousands of repetitions each time an image is created or modified on the display. Hence, in addition to satisfactorily determining the pixel locations, the algorithm used must also execute as rapidly as possible. Speed versus image quality is often the trade off used in selecting the scan-conversion algorithm. In order to provide the fastest execution for a given algorithm, incremental methods are utilized which minimize the number of calculations, and especially the number of multiplications and divisions, performed during each iteration of the algorithm.

Most conventional raster displays rasterize a continuous line one pixel at a time, with each pixel being generated in sequence. Perhaps the most widely used algorithm for doing so is known as Bresenham's line algorithm. An explanation of this algorithm may be found in many computer graphics text books. For example, a description of the algorithm, as well as its derivation, are presented at pages 431–436 of *Fundamentals of Interactive Computer Graphics* by J. D. Foley and A. Van Dam, Addison-Wesley Publishing Company, Inc. (1982), which is incorporated herein by reference. Briefly described, Bresenham's algorithm determines a running error term as well as correction terms to be applied to the running error term as various pixel locations are chosen to represent the true line. The initial error term and each of the correction terms is determined from the total x and y displacements traversed by the line. For each particular pixel, the error term associated with that pixel reflects the amount that the pixel deviates from the true line location. Thus, the error terms for the various pixels may be utilized to determine which pixels are closest to the line. As pixel locations are sequentially chosen and the algorithm is reiterated to choose subsequent pixel locations, the appropriate correction term is added to the running error term in order to account for the change in the error term produced by choosing the previous pixel location. This process is continued until the end of the line is reached and the last pixel location is chosen.

Bresenham's algorithm uses only integer arithmetic, and it lends itself to incremental techniques for performing repetitive calculations of the algorithm. Moreover, the calculations themselves involve only addition, subtraction, and left shifts of binary data. Time-consuming multiplications and divisions are avoided. Consequently, Bresenham's algorithm provides an efficient means for rasterizing a line. However, the algorithm generates only one pixel location in a given machine cycle of the generation hardware. To improve the performance of raster display systems, faster scan-conversion techniques are needed. Furthermore, the pixel locations being generated must be capable of being stored in the raster display's frame buffer memory in such a manner that memory access conflicts are avoided or resolved.

Accordingly, it is an object of the present invention to provide a technique for generating more than one pixel location for a rasterized line in a given machine cycle.

It is a further object of the present invention to provide a method for generating multiple pixel locations in such a manner that memory access conflicts can be resolved while the pixels are being generated, without requiring additional machine cycles for accomplishing the resolution.

It is another object of this invention to provide a pixel generation system in which the calculations involved in determining the pixel locations may be executed quickly using commercially available hardware.

It is also an object of the present invention to provide a pixel generation system which can be adapted to generate a predetermined number of pixels during a given machine cycle.

SUMMARY OF THE INVENTION

In accordance with one of its aspects, the present invention provides a method for generating data values for a plurality of pixels in a single given machine cycle of the pixel generating system. The data values represent a linear function of at least one of the coordinates of the pixels, and the method comprises generating error terms according to Bresenham's algorithm for each of a plurality of contiguous pixels. The number of contiguous pixels is chosen to be equal to the number of pixels which are to be generated during the single machine cycle. The method of the present invention also comprises generating the data values for the plurality of pixels in parallel using a plurality of vector generators. The data values for each pixel are determined as a function of initial values calculated according to Bresenham's algorithm and incremental changes to the initial values which take into account the pixels being generated. Preferably, the inventive method further comprises translating the data values provided by the vector generators into pixel position data which represents the linear function, and storing the resulting pixel position data in such a manner that data which cannot be stored in the machine cycle in which it is generated is recycled for storage in subsequent cycles.

In accordance with another aspect of the present invention, apparatus for carrying out the inventive method comprises means for normalizing the parameters which define the linear function so that the pixel coordinates for the function are contained in the octant of the coordinate system where the y coordinate of the pixel location is greater than or equal to zero but also less than or equal to the x coordinate. The apparatus also includes means for generating initial error terms by applying Bresenham's algorithm to each of a plurality of contiguous pixels, and means for generating, in a parallel fashion during a single machine cycle, the error terms which correspond to pixel locations other than the plurality of contiguous pixel locations used for generating the initial error terms. The parallel pixel generating means is further configured so that a selectable increment is added to a running error term for each parallel pixel generator. The increment has two possible values, with the value selected being determined by the sign of the error term to which the increment is being added. In a preferred embodiment, the increment is determined as a function of the region which contains the rasterized line pixel coordinates.

BRIEF DESCRIPTION OF THE DRAWINGS

The subject matter which is regarded as the invention is particularly pointed out and distinctly claimed in the concluding portion of the specification. The invention itself, however, both as to its organization and its method of practice, together with further objects and advantages thereof, may best be understood by reference to the following description taken in conjunction with the accompanying drawings, in which:

FIG. 5 illustrates the error term decision tree which is formed by sequential calculations in accordance with Bresenham's algorithm, for the first four pixel locations;

FIG. 7 shows the values of the increment used by the present invention for calculating error terms, as a function of the region which contains the coordinates of the linear function involved;

FIG. 8 graphically depicts the constraints imposed on a Bresenham sequence which represents the pixel data being generated, as a function of the region involved;

FIG. 9 illustrates the truth tables which result from the constraints depicted in FIG. 8;

FIG. 10 shows the bit maps for the truth tables illustrated in FIG. 9;

FIG. 14 illustrates the assignment between the vector generators and the data sent to the translation logic, for various values of the error term pointer, in accordance with an alternative embodiment of the MCR logic; and FIG. 15 illustrates the manner in which data which is not stored in a particular machine cycle is used in subsequent cycles, for various values of the error term pointer, in accordance with one embodiment of the MCR logic.

DETAILED DESCRIPTION OF THE PREFERRED EMBODIMENTS

The problem addressed by the present invention is that of representing a continuous linear function by choosing the discrete locations of a two dimensional grid which are closest in location to the true coordinates of the function. This problem is depicted graphically in FIG. 1. Line 20 contains the true x and y values for the linear function $y = x(dy/dx)$. In order to map this linear function onto the pixel grid shown, integer pixel coordinates (which coordinates locate the pixel centers) must be determined for the pixels which lie closest to the true values of the coordinates for line 20.

Figure 1:
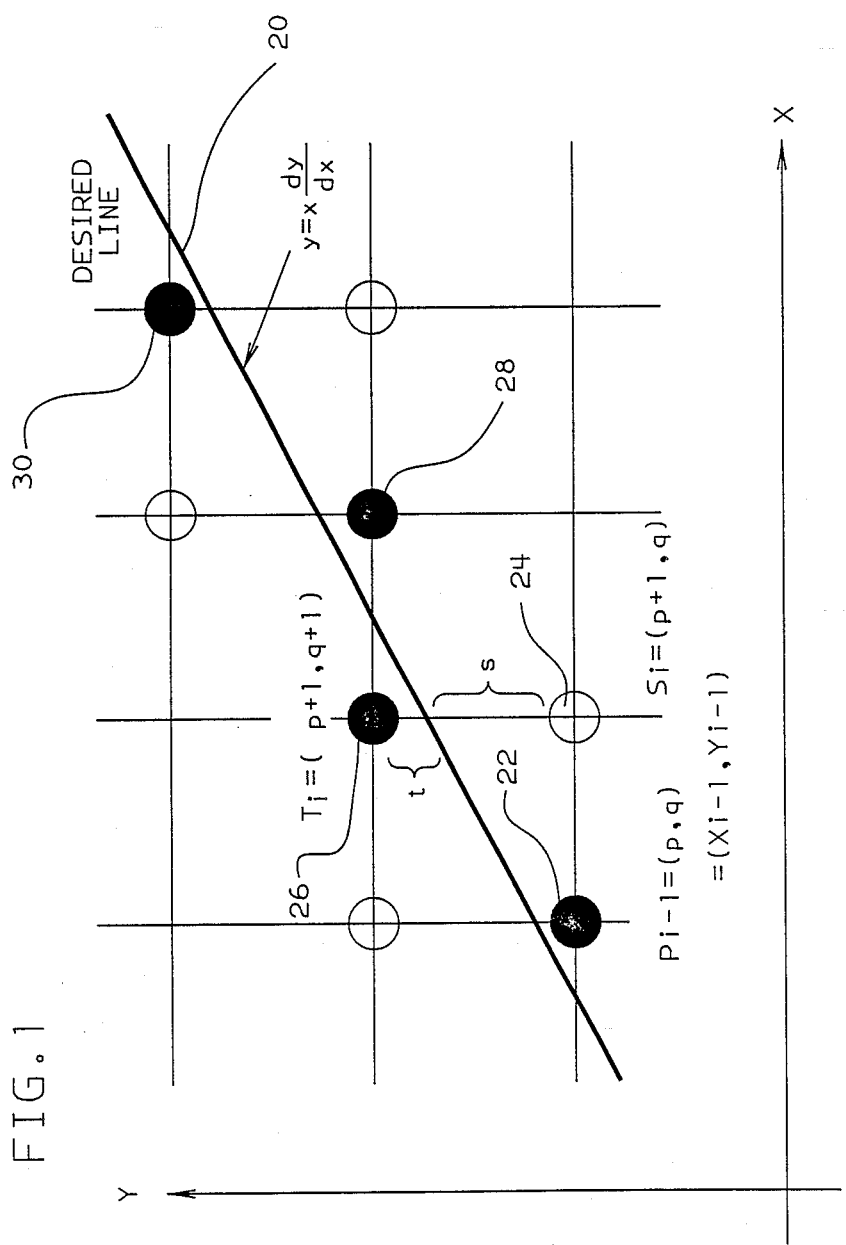
FIG. 1 is a graphic depiction of the problem of representing a continuous linear function on a two dimensional grid of discrete points.

Because of the symmetry of the orthogonal coordinate system, any function which exhibits a linear relationship with one of the pixel coordinates can be normalized to appear in the form shown in FIG. 1. Thus, the problem at hand can be simplified by restricting the location of the linear function to within the octant of the coordinate system where $0' <= dy <= dx$, where $dx = x2 - x1$ and $dy = y2 - y1$ for a linear function which extends between the coordinates (x1, y1) and (x2, y2). Furthermore, there is no loss in generality of the function represented when one end point of the function is located at the origin of the coordinate system, because functions with other origins are simply translations of functions which begin at coordinates (0,0).

With these considerations in mind, the process of mapping a continuous linear function onto a grid having discrete x and y coordinates, such as, for example, rasterizing a line onto a pixel grid, becomes a matter of choosing which one of two possible y-coordinate values provides the pixel location which is closest to the true line, for a given x-coordinate value of the pixel. Thus, in FIG. 1, if pixel 22 has been determined to be closest to the actual line being drawn, during the previous or (i-1)th step, the task at the ith step is to determine which of pixels 24 and 26 is closest to line 20. If the distance between pixel 24 and line 20 is less than the distance between pixel 26 and line 20, then pixel 24 should be chosen; otherwise, pixel 26 should be chosen. In FIG. 1, the distance between pixel 24 and line 20 is designated as s, and the distance between pixel 26 and line 20 is designated as t. Hence, the decision of which pixel to choose is dependent upon whether s is less than t. Stated somewhat differently, if $(s-t) < 0$, pixel 24 is chosen. If $(s-t)$ is not negative, pixel 26 is chosen.

Bresenham's algorithm provides a technique for repetitively making this choice between the two possible pixel locations, for each x-coordinate value of the pixel grid which is traversed by line 20. Bresenham's algorithm starts at the pixel closest to the origin and sequentially determines, one at a time for each successive x-coordinate value for the pixels required to represent the line, which of two possible y-coordinate values should be chosen for each of the x-coordinate values. The algorithm makes this decision by computing a running error term which is proportional to (s−t). Since the error term is proportional to (s−t), the sign of the error term determines whether s is smaller than or larger than t, and, concomitantly, which of the two possible y-coordinate values is closest to the true line.

According to Bresenham's algorithm, an initial error term defined by 2dy−dx is calculated for the pixel located closest to the origin. For the next x-coordinate value of the pixel grid, the sign of this initial error term determines the correct y-coordinate value for the pixel closest to the line. To account for the error associated with this latter choice of the pixel's y-coordinate value, a new error term is calculated by adding an increment to the previous error term. The increment added depends upon whether the previous error term was negative or positive. If it was negative, the increment is defined as 2dy; otherwise it is defined as 2(dy−dx). The sign of the resulting new error term is then used to determine the correct y-coordinate value for the next pixel.

Applying the methodology of Bresenham's algorithm to FIG. 1, in order to determine at the ith step which of pixels 24 and 26 should be chosen, the error term for pixel 22 is first computed. If the sign of the resulting error term is negative, pixel 24 is chosen and the quantity (2dy) is added to the error term calculated for pixel 22. If the error term at pixel 22 is positive, then pixel 26 is chosen and the quantity 2(dy−dx) is added to the error term for pixel 22. Similar application of the algorithm at subsequent steps results in pixels 28 and 30 being chosen.

The incremental changes in the x- and y-coordinates of the chosen pixels shown in FIG. 1 can be represented by a sequence of binary bits, where a "0" indicates that the corresponding coordinate value has not changed from its previous value, and where a "1" indicates that the corresponding coordinate value has been increased by one. Thus, the x-coordinate values of pixels 26, 28, and 30 may be represented by the binary bit sequence "111". Similarly, the increments for the y-coordinate values may be represented as "101". Furthermore, since the bit sequence for the x-coordinate values doesn't change, it is a trivial sequence and the x- and y- coordinate values of pixels 26, 28, and 30 may be accurately represented simply by the bit sequence for the non-trivial coordinate, i.e., by "101". The sequence of coordinate values in the non-trivial direction is often referred to as a "Bresenham sequence". Within the sequence, the bits appearing prior to the bit under consideration are known as history bits and are often designated by Hm, where m is an integer identifying the position of the history bit with respect to the bit under consideration.

The present invention provides for the generation of multiple pixel locations simultaneously, rather than generating each location sequentially as is done by Bresenham's algorithm. The basic concept utilized by Bresenham's algorithm is combined with the high performance and improved throughput associated with parallel processing techniques in order to produce n pixel locations at a time. The present invention utilizes n parallel vector generators which are initialized using Bresenham's algorithm, and increments which are derived using principles which are similar to those underlying the Bresenham algorithm, to generate n pixels in a single machine cycle. In the methodology of the present invention, each vector generator calculates its own running error term and uses the sign thereof, in conjunction with other information as described below, to determine which of two possible pixels is closest to the true coordinates for the linear function being represented. The sign of the error term is also used to select the appropriate correction term for addition to the running error term, in preparation for the next vector generation cycle.

Figure 2:
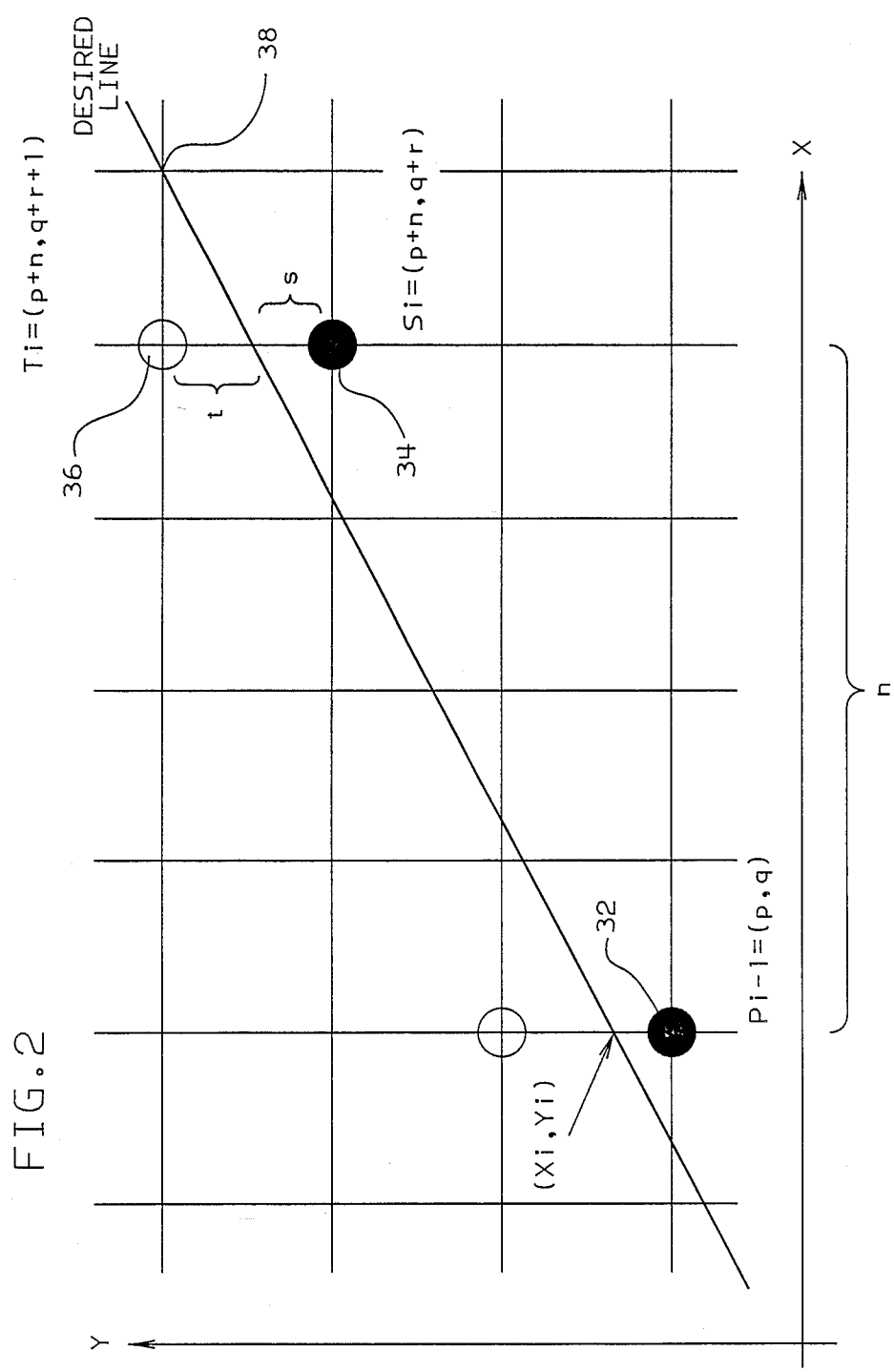
FIG. 2 is a graphic depiction similar to that of FIG. 1 for deriving the values for the increments employed in the method of the present invention.

The derivation of the increments to be used in adjusting the running error term from cycle to cycle is outlined as follows. Referring to FIG. 2, if pixel 32 has been determined to be the closest to the true coordinates (xi, yi) of line 38 during the (i−1)th step, at the ith step the determination of whether pixel 34 or pixel 36 is closest to line 38 depends upon the sign of the error term for pixel 32. Similarly to Bresenham's algorithm, the error term is defined to be proportional to (s−t). Hence, when the sign of the error term at pixel 32 is negative, s is less than t and pixel 34 is closer to line 38 than pixel 36 is. Conversely, if the error term at pixel 32 is greater than or equal to zero, t is less than or equal to s and pixel 36 should be chosen.

If it is assumed that the pixel grid shown in FIG. 2 is "normalized" so that $s+t=1$, then $t=1-s$. Substituting this value of t into the expression s−t, we obtain:

$$(s-t)=2s-1. \tag{1}$$

If we also assume that the line being drawn may be between any two points and that the first end point is nearer the origin than the second end point, the end points of the line may each be translated so that the point shown in FIG. 2 as having coordinates (xi, yi) lies at the origin and therefore has translated coordinate values of (0,0). Hence, line 38 is defined by the equation $y=(dy/dx)x$. For pixels 34 and 36, $x=p+n$, and therefore $y=(dy/dx)(p+n)$. However, from FIG. 2 it is evident that, for $x=p+n$, $y=q+r+s$, so that:

$$q+r+s=(dy/dx)(p+n). \tag{2}$$

Solving equation (2) for s and substituting the resulting value into equation (1), we obtain:

$$(s-t)=2s-1=2(dy/dx)(p+n)-2q-2r-1. \tag{3}$$

Multiplying both sides of equation (3) by dx and rearranging terms, and then defining $Di=dx(s-t)$, we obtain:

$$Di=2(p)(dy)-q(dx)+2n(dy)-(1+2r)dx. \tag{4}$$

However, with the grid coordinate system aligned with line 38 so that the point (xi, yi) is located at the origin of the grid system, $p=xi$ and $q=yi$. Substituting these values into equation (4) results in:

$$Di=2(xi)(dy)-yi(dx)+2n(dy)-(1+2r)dx. \tag{5}$$

Writing a similar expression for D(i+n), and subtracting the expression for Di from the expression for D(i+n), the result is:

$$D(i+n)-Di=2dy(x)(i+n-xi)-2dx(y)(i+n)-xi. \tag{6}$$

From FIG. 2 it can be discerned that $x(i+n)-xi=n$. It is also evident that, if Di is less than zero, then $y(i+n)-yi=r$. Similarly, if Di is greater than or equal to zero, then $y(i+n)-yi=r+1$. Using these conditions in equation (6) gives:

$$D(i+n)-Di=2n(dy)-2(r+1)dx, \text{ for } Di>=0, \text{ and} \quad (7)$$

$$D(i+n)-Di=2n(dy)-2(r)dx, \text{ for } Di<0. \quad (8)$$

Thus, the respective increments which are added to the error term are expressed as $2n(dy)-2(r)dx$ and $2n(dy)-2(r+1)dx$. In these expressions the variable r is used to normalize the equations to the region of the octant within which the linear function is contained. The variable r takes on integer values between 0 and $(n-1)$. The significance of this variable will be further explained hereinbelow.

Because the point on line 38 designated by coordinates (xi, yi) was assumed to be closer to the origin of the pixel coordinate system then ar the other points of line 38, the above derivation is for a line drawn from left to right. For lines which are drawn from right to left, the determination of which pixel is closest to the line depends upon whether $Di<=0$ rather than just being less than zero. This adjustment assures that lines drawn in opposite directions are represented by the same pixel locations. Since the algorithm of this invention employs integer arithmetic, simply subtracting one from the initial error terms will assure the desired bi-directional symmetry.

Attempting to produce multiple pixels in a parallel fashion, while utilizing a scan-conversion algorithm which is generally sequential in nature, raises problems in a number of areas. Of particular concern are the processing required to initialize the pixel generation system, the interpretation and translation of the resulting running error terms into the correct pixel locations, and resolution of memory module access conflicts which may occur when attempting to simultaneously write several pixel locations into a frame buffer memory. The present invention provides solutions for each of these problems. The vector generators are initialized with error terms which are calculated according to Bresenham's algorithm, and appropriate increments are determined for adjusting the running error terms for each vector generator from cycle to cycle. The sign bits of the running error terms calculated by the vector generators are interpreted in accordance with other relevant information, so that the translated data represents a mapping of the linear function onto a two dimensional grid of discrete points. The invention further provides schemes for deciding how many of the translated data bits can be stored during a given cycle and for recycling the unstored data bits so that they may be stored in later cycles. Each of these aspects of the invention are more fully described in the remainder of the specification.

Figure 3:
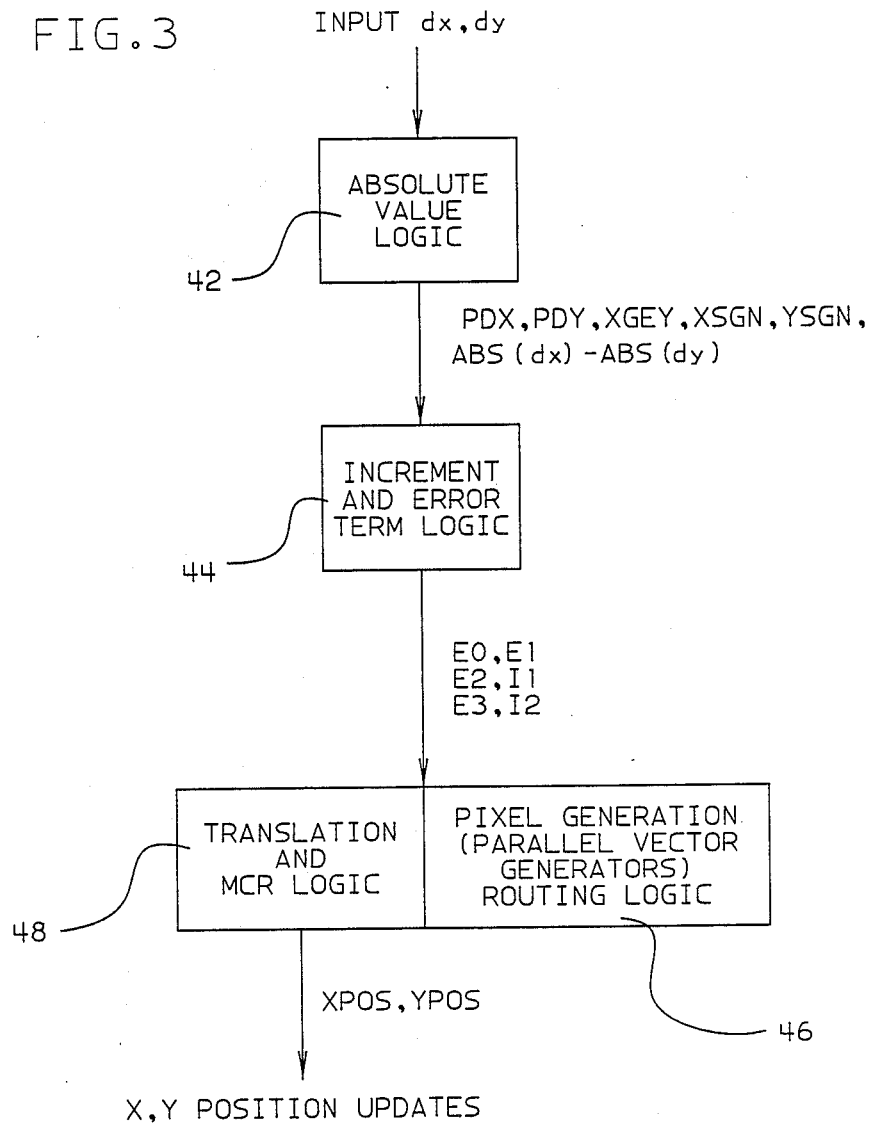
FIG. 3 is a block diagram schematically illustrating one embodiment of a multiple pixel generation system in accordance with the present invention.

FIG. 3 is a block diagram schematically illustrating one embodiment of the function partitioning and flow sequence for a multiple pixel generation system in accordance with the present invention. For some applications, it may not be necessary to provide all of the functions shown in FIG. 3. In accordance with the present invention, the basic functions required for generating data values for a plurality of pixels in a single given machine cycle of the pixel generating system, wherein the data values represent a linear function of at least one of the coordinates of the pixels, are contained in blocks 44 and 46. Block 44 generates error terms according to Bresenham's algorithm for each of a plurality of contiguous pixels, with the number of contiguous pixels being equal to the number of pixels which are to be simultaneously generated during the same machine cycle. Block 44 also generates the increments required to update the error terms from cycle to cycle. Block 46 contains the functions required for simultaneously generating the data values for the plurality of pixels, during the given machine cycle. Block 46 contains a plurality of vector generators which are connected in parallel to one another and which are arranged so that each vector generator provides the data values for an associated one of the plurality of pixels. For each vector generator, the data values are determined as a function of the number of pixels being generated in one cycle, and also as a function of the error terms generated in block 44.

Preferably, the pixel generation system of the present invention further includes blocks 42 and 48. Block 48 contains functions for translating the data values provided by the vector generators into pixel position data which represent the linear function being mapped. Block 48 may also include functions for storing the data values simultaneously generated during the given machine cycle, as well as schemes for resolving memory module access conflicts. In one embodiment, the generated data values which meet the memory access constraints are stored during the given machine cycle, and unstored data values are regenerated by the vector generators in subsequent machine cycles. In an alternative embodiment, the generated data values which meet the memory module access rules are stored in the given machine cycle, and the remaining generated data values are designated for storage in subsequent machine cycles, without being regenerated by the vector generators.

Block 42 in FIG. 3 contains the functions which are required to normalize the parameters for the linear function so that, for all such functions, the pixel coordinates for the function are contained in the same octant of the pixel coordinate system. In one embodiment, the grid of possible pixel coordinates is divided into octants so that, for the octant designated as octant number one, the pixel coordinate which represents the linear function is greater than or equal to zero but also less than or equal to the pixel coordinate which serves as the argument for the linear function. The parameters of the linear function are then normalized to fall within this first octant. Preferably, this first octant is divided into a plurality of regions, with the number of regions being equal to the number of pixels which are to be generated during a single machine cycle. These regions are further configured so that the particular region which contains the pixel coordinates representing the linear function can be determined as a function of the signs of the error terms generated in block 44. For this latter configuration, the pixel data being generated is further a function of the identifying data for the region which contains the coordinates of the linear function.

The flow sequence through the pixel generation system shown in FIG. 3 can be briefly described as follows. User-specified parameters dx and dy are received as inputs by absolute value logic block 42. The variable dx is the difference between the ending and beginning values of the x-coordinate, and dy is the difference between the ending and beginning values of the y-coordinate. The absolute value of each of dx and dy, as well as the difference between those absolute values, are calculated in block 42 and then sent to increment and error term logic block 44. Also determined in block 42 is data signal XGEY which indicates whether input dx is greater than or equal to input dy. Depending upon the result of this comparison, the absolute value of dx is assigned to variable PDX and the absolute value of dy is assigned to variable PDY, or the absolute value data stored in these variables is swapped. The final two pieces of data which are captured in block 42 and sent to block 44 are the signs of inputs dx and dy. Block 44 uses the various pieces of data from block 42 to calculate initial error terms for each of the parallel vector generators in block 46. These initial error terms are shown in FIG. 3 as E0, E1, E2, and E3. Also calculated in block 44 are the increments which are added to the running error term for each of the parallel vector generators in block 46, in order to adjust the running error term to reflect the pixels generated in each cycle. Translation and MCR logic block 48 converts the signs of the running error terms for each of the vector generators in block 46 into a sequence of binary bits which represent the incremental changes in the value of the non-trivial coordinate of the rasterized line pixel locations. The memory contention resolve (MCR) logic decides which of the bits in this sequence can be stored for the present machine cycle. Those that can be stored are sent out of block 48 as XPOS and YPOS data which can be used to update the x and y position counters for the frame buffer memory.

Figure 4:
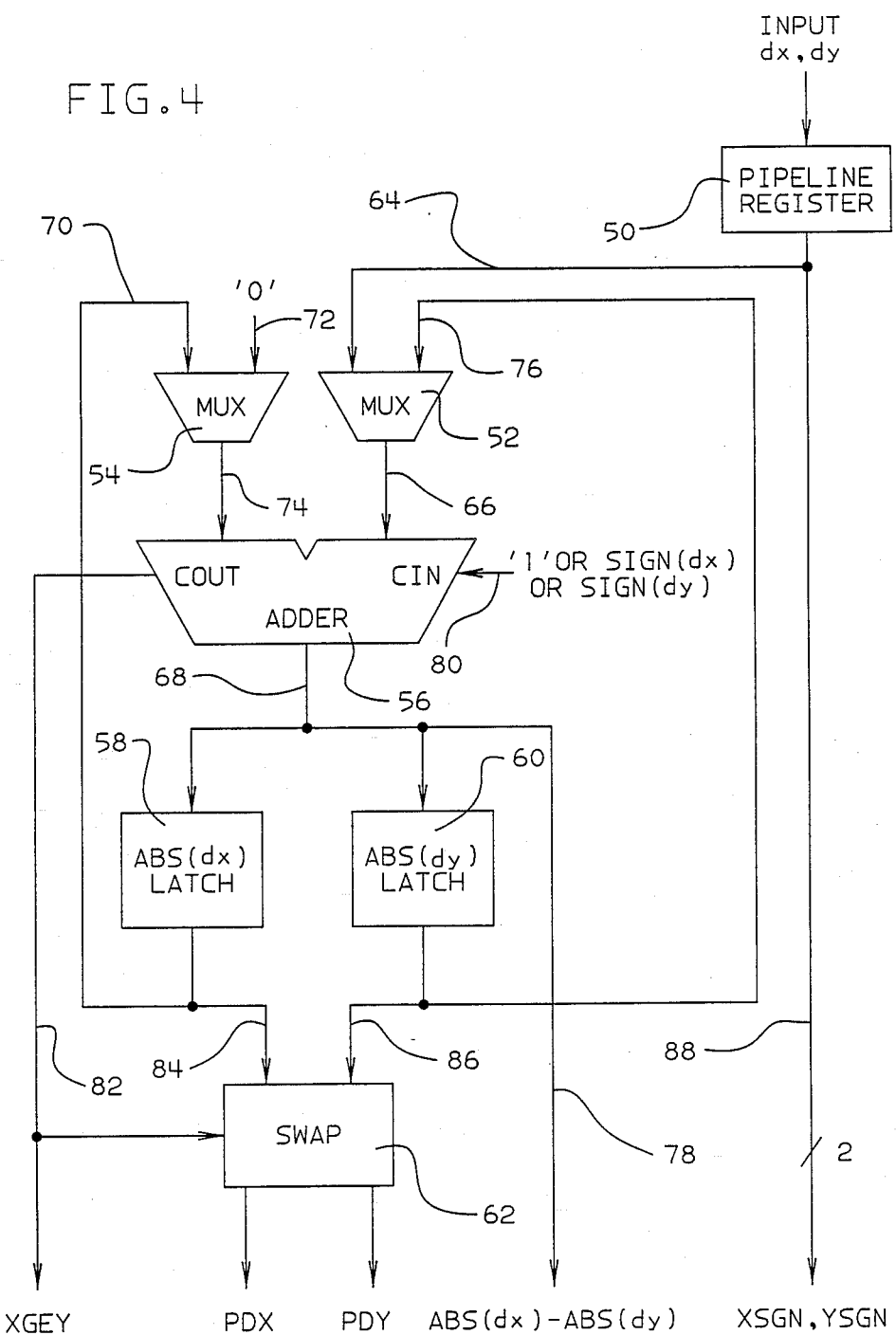
FIG. 4 is a block diagram schematically illustrating one embodiment of the absolute value logic shown in FIG. 3.

One embodiment for absolute value logic block 42 is schematically illustrated by the block diagram of FIG. 4. If input dx exists in pipeline register 50 before the first processing cycle occurs for the system shown in FIG. 4, the functions described above as being contained in absolute value logic block 42 can conveniently be performed by the apparatus of FIG. 4 in three consecutive processing cycles. During the first cycle, dx is passed from pipeline register 50 via line 64 to multiplexer 52, where it is, in turn, passed via line 66 to adder 56. In adder 56 dx is combined with the signal coming into adder 56 via line 80, in order to calculate the absolute value of dx. The input signal on line 74 is also added to the absolute value of dx in adder 56. In the first processing cycle, multiplexer 54 chooses the "0" level signal on input line 72. As a result, the addition of the signal on input line 74 is a nullity and the signal transferred from adder 56 to latch 58 via line 68 represents the absolute value of dx.

In the second processing cycle, dy is passed from register 50 through the apparatus to become the absolute value of dy stored in latch 60, in the same manner as just described for dx. In the third processing cycle, the output of latch 58 is sent to multiplexer 54 via line 70, and the output of latch 60 is sent to multiplexer 52 via line 76. Multiplexers 54 and 52 pass these output signals from latches 58 and 60, respectively, to adder 56 via respective lines 74 and 66. Combined with the input signal on line 80, these inputs to adder 56 produce an output on line 68 which represents the difference between the absolute value of dx and the absolute value of dy. This difference between absolute values is sent to the next stage via line 78. The calculation in adder 56 also produces an output signal on line 82 which indicates whether dx is larger or smaller than dy. This signal, in turn, controls the processing in block 62. If the variable XGEY equals zero, the absolute value of dx being passed to block 62 via line 84 is assigned to the variable PDY, and the absolute value of dy being sent to block 62 via line 86 is assigned to the variable PDX. On the other hand, if XGEY equals one, no swap is performed and the absolute values of dx and dy are assigned to variables PDX and PDY, respectively. The data for the remaining variables, XSGN and YSGN, are obtained from register 50 via line 88.

As mentioned hereinabove in relation to FIG. 3, increment and error term logic block 44 calculates the initial error terms for each of the parallel vector generators in block 46, as well as the two increment terms which are used to update the running error term for each vector generator, from cycle to cycle. The initial error terms for the n parallel vector generators are determined by sequentially applying Bresenham's algorithm to each of n contiguous pixels. Thus, for the first n pixel locations P0, P1, . . . , P(n−1), the error terms are the Bresenham error terms E0, E1, . . . , E(n−1). For Bresenham error terms, each succeeding error term $E(i+1)$ may be calculated by adding the appropriate increment to the previous error term Ei. The incremental value to be added depends upon the sign of Ei. If the sign is negative, the increment is 2dy; if the sign is positive, the increment is 2dy−2dx. Thus, error term E1 equals E0+2dy if the sign of E0 is negative. If the sign of E0 is positive, E1 equals E0+2dy−2dx. Since $E0=2dy-dx$ in Bresenham's algorithm, E1 equals either 4dy−dx or 4dy−3dx. The remaining error terms E2 through E(n−1) may each be sequentially calculated in a similar manner. The calculated error terms thus form a decision tree in which the members of the tree are linked by constant incremental values. The resulting error term decision tree for n=4 is shown in FIG. 5. This incremental relationship among the various error terms is important because it allows the corresponding stage of the hardware to operate without wasting cycles doing a conditional branch to the next error term.

Increment and error term logic block 44 also calculates the increments which are used in updating the running error term of each parallel vector generator, as the error terms for pixel positions P(i+n), P(i+2n), etc. are generated. Similarly to the error terms generated by Bresenham's algorithm, the error terms E(i+n), E(i+2n), etc. generated in accordance with the present invention may each be calculated by adding an appropriate increment to the previous error term. Also similarly to Bresenham's algorithm, the choice between two possible values of the increment is determined by the sign of the error term to which the increment is to be added. Preferably, the hardware for calculating the two possible values for the increment is configured so that the increments are determined during one or more of the processing cycles used to generate the initial error terms for the n parallel vector generators. Doing so reduces the number of processing cycles that would otherwise be required for initializing the pixel generating system, as well as reducing hardware complexity.

For these reasons, in a preferred embodiment of the inventive pixel generation system the signs of at least some of the error terms for the first n pixel locations are used to determine which of the n possible regions of the first octant of the coordinate system contains the pixel coordinates for the mapped function. The two possible values of the increment are then determined as a function of that region. One equation for the incremental values as a function of this region was derived above in relation to FIG. 2. Hence, in one preferred embodiment, the two possible values of the increment are 2n(dy)−2(r+1)(dx) and 2n(dy)−2(r)(dx), for positive and negative signs, respectively of the error term to which the increment is to be added. In these expressions, r designates the region containing the coordinates for the linear function.

Figure 6:
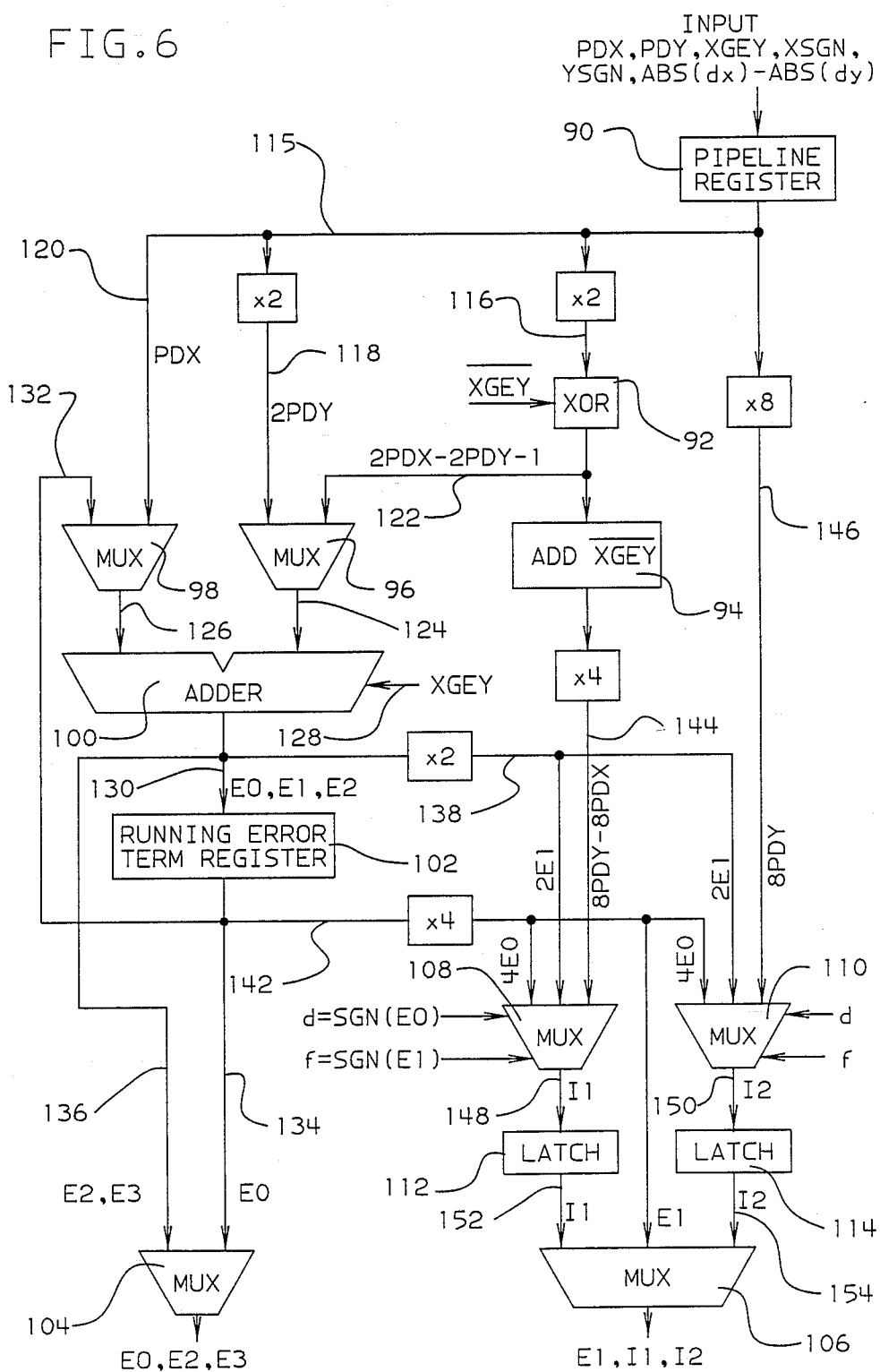
FIG. 6 is a block diagram schematically illustrating one embodiment of the increment and error term logic shown in FIG. 3.

FIG. 6 schematically illustrates one embodiment of increment and error term logic block 44, for the case where n=4. For the embodiment shown, the four error terms and two values of the increment can all be calculated and sent to the next stage of the hardware in four processing cycles. It is assumed that all of the output signals from absolute value logic block 42 are in pipeline register 90 In the first cycle, the difference between the absolute value of x and the absolute value of y is passed from register 90 via line 115, multiplied by 2 by performing a left shift operation, and sent as an input to exclusive OR 92 via line 116. The output of exclusive OR 92 is passed to multiplexer 96 via line 122. Multiplexer 96, in turn, selects the signal on line 122 and sends it to adder 100 via line 124. During the same cycle, PDX is sent from register 90 to multiplexer 98 via lines 115 and 120. PDX is selected by multiplexer 98 and sent to adder 100 via line 126. Adder 100 combines the inputs on lines 124, 126, and 128 and sends the output to error term register 102. In this first cycle, the output of adder 100 is the Bresenham error term for the first pixel position. PDX and any command word used in the system may also be sent out of register 90 to other hardware stages, during this first cycle. During the second cycle, E0 is sent from register 102 to multiplexer 104 via line 134 and also to multiplexer 98 via line 132. E0 is passed through multiplexer 98 to adder 100 via line 126. As in the first cycle, the difference between the absolute of dx and the absolute value of dy is multiplied by 2 and sent to exclusive OR 92, the output of which is sent to multiplexer 96. PDY is sent out of register 90 via line 115, multiplied by 2, and sent as an input to multiplexer 96 via line 118. Depending upon the sign of error term E0, multiplexer 96 chooses one or the other of the inputs on lines 118 and 122, and passes the chosen signal to adder 100. The signals on lines 118 and 122 represent the increments for calculating the Bresenham error terms. Thus, the output of adder 100, when the input on line 126 is E0, is the next error term, E1. E1 is sent to register 102 via line 130 and to multiplexer 106 via line 140. During this second cycle, E0 and E1 are sent to the next hardware stage by multiplexers 104 and 106, respectively. Also during the second cycle, E0 is multiplied by 4 and sent to multiplexers 108 and 110 via line 142. E1 is multiplied by 2 and sent to multiplexers 108 and 110 via line 138. The output of exclusive OR 92 is sent to adder 94, the output of which is 2PDY−2PDX. This expression is multiplied by 4 and sent to multiplexer 108 via line 144. In addition to being sent out of register 90 via line 115, PDY is also multiplied by 8 and sent to multiplexer 110 via line 146. The signs of error terms E0 and E1 are sent to each of multiplexers 108 and 110, and are combined with the other inputs thereof to determine the two values of the increment, I1 and I2. The first increment value is determined in multiplexer 108 and is sent to latch 112 via line 148. The second increment is determined in multiplexer 110 and is similarly sent to latch 114 via line 150.

In the third processing cycle error term E2 is generated in the same manner as was described for error term E1. E2 is sent via line 136 and multiplexer 104 to the next hardware stage. During the same cycle, increment I1 is sent via line 152 and multiplexer 106 to the next stage. In the last cycle, error term E3 is generated in the same manner as was described for error term E1. E3 is sent out of the apparatus through line 136 and multiplexer 104. In this last cycle, increment I2 is also sent to the next hardware stage, via line 154 and multiplexer 106.

The increments determined by multiplexers 108 and 110 depend upon the sign of each of E0 and E1. These sign bits, in turn, determine the region which contains the coordinates of the linear function. For the embodiment of FIG. 6, the increment determined by multiplexer 108 can be expressed as (8PDY−8PDX)(/d)(/f)+2E1(/d)f+4E0(d)(/f)+2E1(d)(f), where d and f are the sign bits of E0 and E1, respectively, and where /d and /f mean "not d" and "not f", respectively. The increment determined by multiplexer 110 can similarly be expressed as 2E1(/d)(/f)+4E0(/d)(f)+2E1(d)(/f)+8PDY(d)(f). The region decoded by bits d and f and corresponding increments for various values thereof are shown in FIG. 7. Because bits d and f represent the signs of E0 and E1 respectively, they are automatically passed to later hardware stages as the most significant bits of E0 and E1, whenever those two error terms are passed from stage to stage.

Once the parallel vector generators of block 46 shown in FIG. 3 have been initialized by calculating error terms for the first n contiguous pixel positions, n error terms at a time are generated in parallel during a single machine cycle by the vector generators. The n error terms correspond to the next n pixel locations which follow those locations generated in the previous cycle. Each of the n subsequent error terms is determined by adding one of the two possible values of the increment determined in block 44 to the running error terms for the respective vector generators. In order to form a binary bit stream which represents the error terms generated, a binary bit of 1 or 0 may be assigned to each error term generated, depending upon the sign of the error term. In one embodiment, a 0 is assigned when the error term sign is negative, and a 1 is assigned otherwise. For this arrangement, a binary bit of 1 also indicates a step up in position of the corresponding pixel coordinate.

However, since the data for the n multiple vector generators are being processed in parallel, the stream of data bits obtained using the above conventions does not necessarily reflect the "true" Bresenham sequence for the rasterized line. Accordingly, one of the functions included in translation and MCR logic block 48 of FIG. 3 is translating the data from the parallel generators into pixel positions for the rasterized line or other mapped linear function. In one embodiment, the binary bits for the Bresenham sequence representing the rasterized function are determined, at least in part, as a function of the history bits previously appearing in the bit sequence, and as a function of the region which contains the rasterized function's pixel coordinates. For each of these regions, the translated data is partially specified by the conditions that must be met in that particular region.

Among the conditions which are unique to each of the n regions used for generating the n pixels per cycle is the minimum and maximum number of increments in the y-coordinate value which are allowed in each region. Referring now to FIG. 8, if the octant being used for generating n pixels simultaneously is divided into n regions, lines falling within region r have slopes between r/n and (r+1)/n, for all values of r between 0 and n−1. For the case of n=4 shown in FIG. 8, all lines falling within region 0 have slopes of between 0 and 0.25. For region 1, the slopes range between 0.25 and 0.5, for region 2 the slopes range between 0.5 and 0.75, and for region 3 the slopes range between 0.75 and 1.0.

Furthermore, for any given region r, the change in y-coordinate value from pixel position S to the corresponding one of positions A, B, C, D, or F must be between r and r+1. Thus, for any given region r, a Bresenham group of n bits may have either r or r+1 bits which have a value of 1. For example, in region 0, the multiple pixel generation algorithm selects between pixels D and F, and the Bresenham group of four bits may contain either 0 or 1 bits which each have a value of 1. In region 1, the choice is between pixels C and D; in region 2, the choice is between pixels B and C; and in region 3, the choice is between pixels A and B. Recalling from FIG. 7 that, for n=4, bits d and f decode to identify one of the four regions, and also recalling that d and f are the sign bits for error terms E0 and E1, respectively, it becomes apparent that the region information and the history bits can be combined to determine the true Bresenham sequence for the pixels being generated. If S0 designates the sign of E0, and if S0 is represented in binary as 1 for the case where E0 is negative, then when S0=1, only r bits in the Bresenham group of four may be 1's. Conversely, if S0=0, then r+1 bits in the Bresenham group must be 1's.

If we let b0 denote P0 in region 0, c0 denote P0 in region 1, d0 denote P0 for region 2, and e0 denote P0 for region 3, then the four bit Bresenham sequence in region 0 may be expressed as H3 H2 H1 b0, where H1, H2, and H3 represent the history bits prior to the occurrence of b0. The Bresenham sequences for the other regions may be similarly expressed by replacing b0 with c0 for region 1, with d0 for region 2, and with e0 for region 3. If we apply the constraints stated above, i.e., that r+1 bits of the sequence must be 1's when S0 is 0 and that r bits must be 1's when S0 is 1, the truth tables shown in FIG. 9 for the respective regions are constructed. In regions 0 and 1 there is an additional constraint imposed that a Bresenham group of two may only have a maximum of one bit whose value is 1. Therefore, the Bresenham sequences 0110, 1100, and 0011 are not valid in regions 0 and 1. Additionally, in regions 2 and 3 a Bresenham group of two must have a minimum of one bit whose value is 1. Accordingly, the Bresenham sequences 0011, 1001, and 1100 are not valid in regions 2 and 3. If these additional constraints are imposed on the truth tables shown in FIG. 9, the resulting sets of parameter values may be converted to the bit maps shown in FIG. 10 for the respective regions. (It should be understood that, in FIGS. 9 and 10, "D" represents a "don't care" condition for the associated bit, and is not related to the "d" used throughout this specification to represent the sign of error term E0.)

For each of the bit maps shown in FIG. 10, Boolean equations can be generated which express b0, c0, d0, and e0 in terms of S0 and H1-H3. Thus:

In region 0, b0=/H3&/H2&/H1&/S0;
In region 1, c0=/H1&/S0+/H3&/H2&/H1;
In region 2, d0=/H1+/H3&/S0+/H2&/S0; and
In region 3, e0=/(H3&H2&H1&S0).

Furthermore, P0 may be expressed in terms of b0, c0, d0, e0 and the sign bits d and f as:

P0=b0&d&f+c0&d&/f+d0&/d&f+e0&/d&/f.

In each of the above equations, "+" designates an OR operation, "&" designates an AND operation, and "/" designates NOT.

In one embodiment, the subsequent pixels P1, P2, and P3 (for n=4) are determined by cascading three additional stages of logic which essentially replicate the Boolean expressions described above. Alternatively, equations for P1, P2, and P3 are derived through Boolean substitution and reduction. The first method for determining pixels P1-P3 reduces the Boolean expressions required, but requires additional propagation time for the signals to pass through the additional logic stages. The second method reduces the delay time but increases gate count. In accordance with a preferred embodiment of the present invention, the translation logic comprises a combination of cascaded and Boolean logic elements. For the case of n=4, the logic may be grouped into "slices" of two bits each, with the two slices being cascaded. In this implementation, each slice generates two Bresenham bits. Such an arrangement of the translation logic reduces gate count, signal fan-out, and equation complexity while requiring only six NAND gate levels.

Figure 11A:
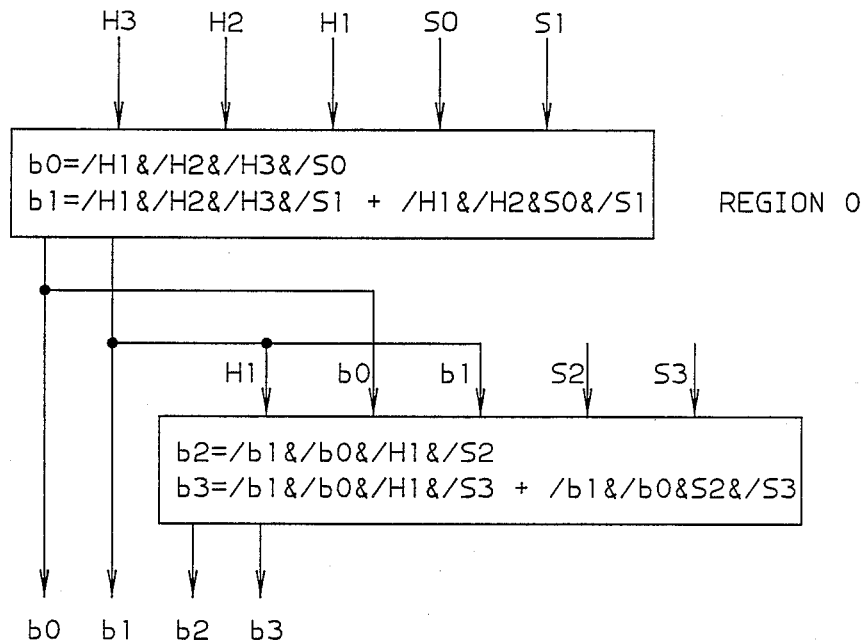
FIG. 11 schematically illustrates one embodiment of the translation logic shown in FIG. 3.
Figure 11B:
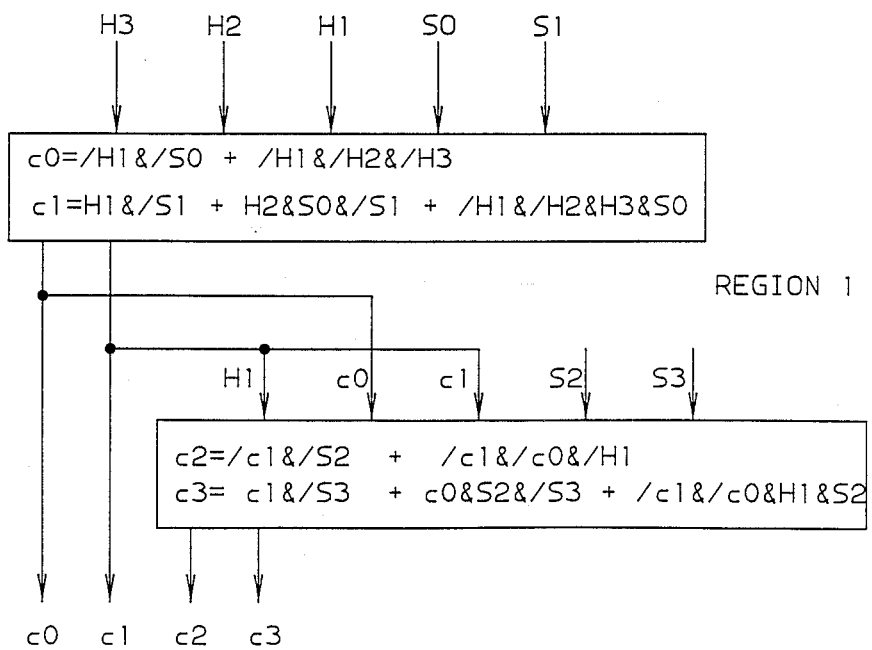
Figure 11C:
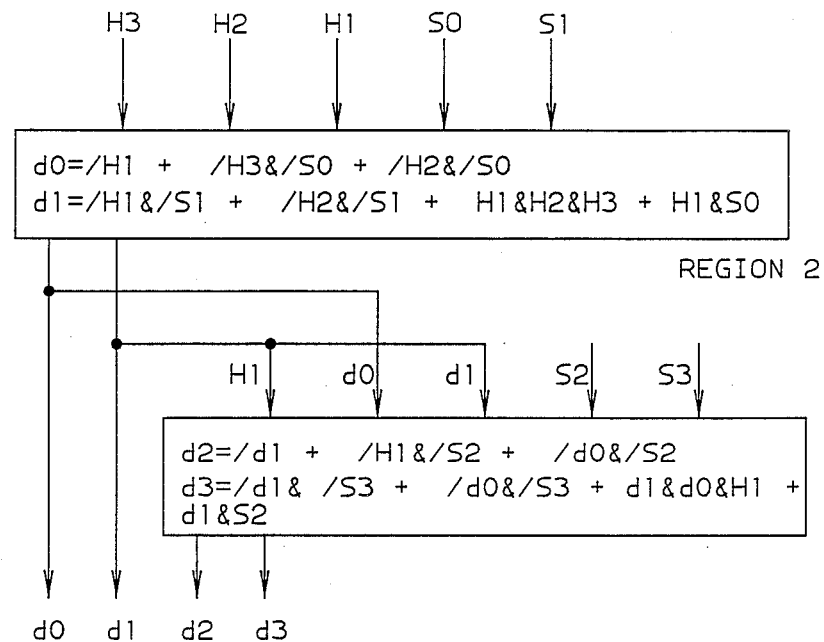
Figure 11D:
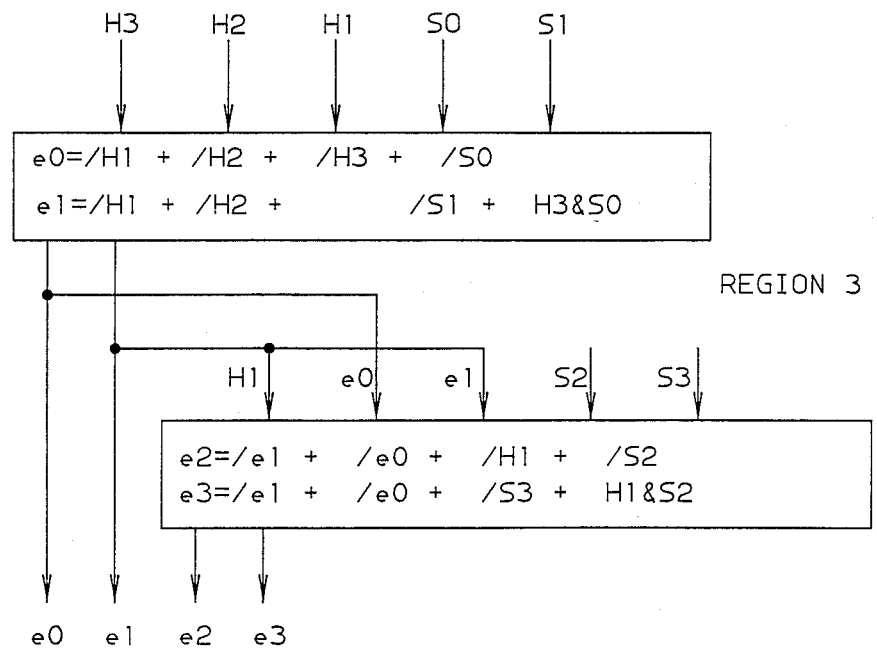
Figures 11, 13:
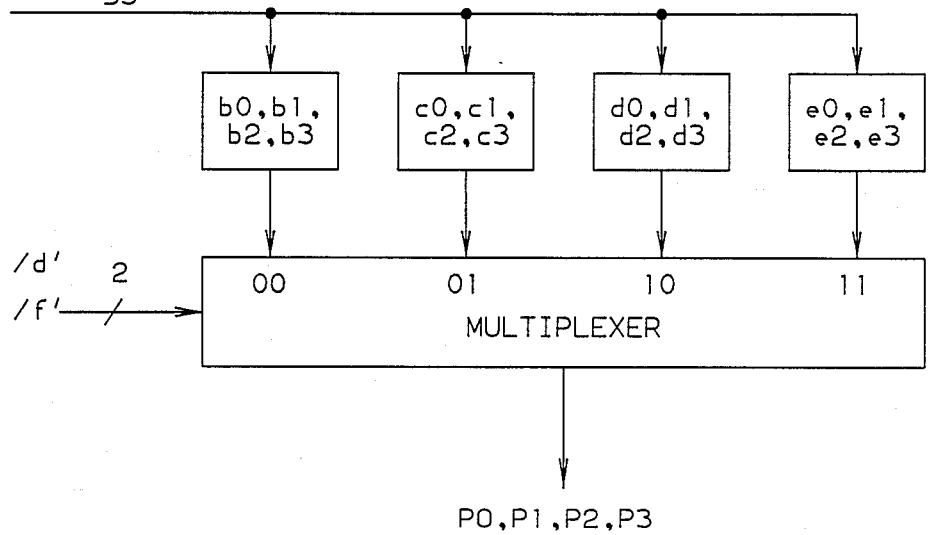
FIG. 13 shows the shift in the error terms and history bits that is produced by the MCR logic shown in FIG. 12, as a function of the number of generated pixels which can be stored in a given cycle.

One arrangement of the translation logic which provides this type of combined Boolean and cascaded logic functions is schematically illustrated in FIG. 11. The logic for each of regions 0-3 is shown in FIGS. 11(a)-(d), respectively, and the manner in which the logic for all of the regions is tied together is illustrated in FIG. 11(e). In each of FIGS. 11(a)-(d) the second Boolean equation in each logic block is derived by shifting the history bits by one position and substituting the new history bits into the first Boolean expression in the block. For example, the equation for b1 is derived by substituting, in the equation for b0, H2 for H3, H1 for H2, S0 for H1, and S1 for S0. By performing the Boolean algebra involved and eliminating non-essential terms, the result is the equation shown for b1.

Figure 12:
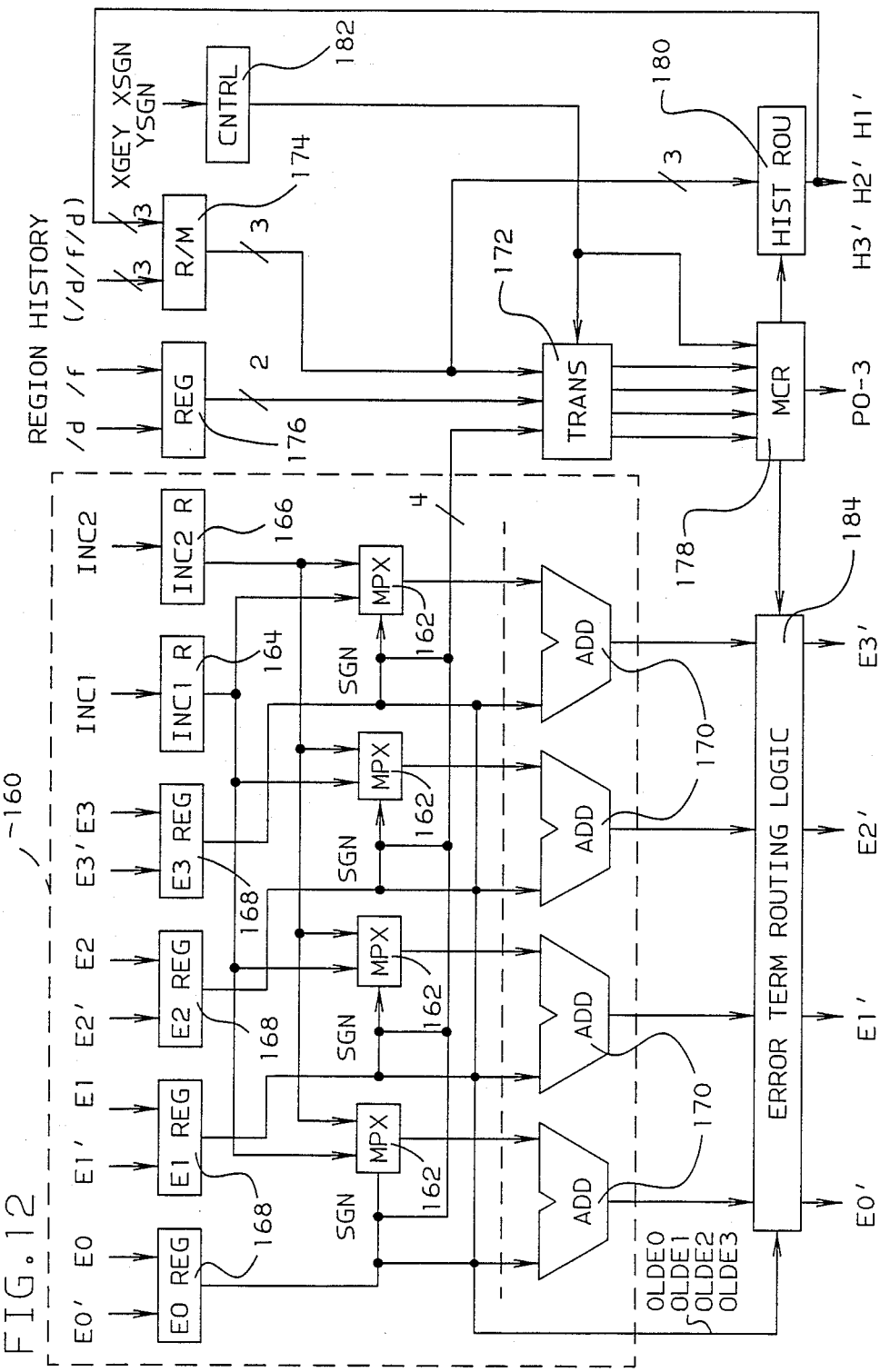
FIG. 12 is a block diagram schematically illustrating one embodiment of the MCR logic shown in FIG. 3.

The block diagram of FIG. 12 schematically illustrates one configuration for combining pixel generation block 46 and translation and MCR logic block 48 shown in FIG. 3. Parallel vector generators 160 each include multiplexer 162 for choosing one of the two possible values for the increment, which values are stored in registers 164 and 166. In adders 170 the increment chosen by multiplexers 162 for each vector generator is added to the running error term for that generator, which running error terms are stored in registers 168. The sign bits of the error terms stored in registers 168 are sent as an n-bit signal to translation logic 172, where that signal is combined with an (n−1)-bit history signal from register/multiplexer 174 and a 2-bit region signal from register 176. The true Bresenham sequence resulting from combining these signals in translation logic 172 is sent to memory contention resolve logic 178, the function of which is described below. The history bits required for translation logic 172 are initialized through register/multiplexer 174 so that H1=/d, H2=/f, and H3=/d. In this manner, history bits H1-H3 are initialized so as to give the correct first four pixels when the logic functions within translation logic 172 are performed. After the initial pass, updated history bits are received by translation logic 172 from history routing logic 180 through register 174.

The function of MCR logic 178 is to resolve memory contention problems that arise when more than one pixel must be written into the memory device during a single machine cycle. Memory contentions usually arise in the context of frame buffer limitations. Memory conflicts may be due to the need to access multiple memory modules in order to write two or more pixels into the frame buffer, or because of memory access conflicts resulting from the frame buffer's memory configuration and rules for accessing the memory addresses. MCR logic 178 resolves these memory contentions by determining how many of the generated pixels can be written conflict-free in a particular cycle and by recycling those pixels that can't. By recycling the information for the pixels which can't be stored in a particular cycle, the memory contention problem is resolved "on the fly" for each processing cycle. Accordingly, the maximum number of pixels that can be stored in any given cycle is generated and stored by the pixel generation system. Furthermore, with the memory contention logic so configured, no additional control hardware is required to coordinate the operation of the pixel generation system with that of the pixel storage system. MCR logic 178 provides for self-optimization of the pixel generation system so that between 0 and n pixels are generated in any given cycle without disrupting either the data flow or the data integrity. The actual number of pixels stored during each cycle is subtracted from a length counter contained in control 182, and the processing is continued until the value in the length counter becomes zero.

In the embodiment shown in FIG. 12, the generated pixel locations which meet the access rules of the memory device are stored therein during the processing cycle that they are generated. Those pixels which cannot be so stored are regenerated in subsequent processing cycles and stored in the memory device when doing so does not cause memory access conflicts. In FIG. 12, the pixels which may be stored are sent out of MCR logic 178 as pixels P0-M, where M+1 equals the number of pixels being stored. For those pixels which cannot be stored during the given machine cycle, the associated error terms are sent via error term routing logic 184 back to the running error term register 168 of the corresponding vector generator. In the next processing cycle, that error term is reprocessed along with the error terms in the other registers 168. History bit routing logic 180 also recycles the history bits for the pixels which are not stored. Appropriate control signals from MCR logic 178 indicate to error term routing logic 184 and history bit routing logic 180 whether old or new data should be used in the next processing cycle. The error terms and history bits to be used in the next processing cycle, as a function of the number of pixels that can be stored in the present processing cycle, are shown in FIG. 13. As such, FIG. 13 illustrates how unstored data is regenerated for storage in later cycles.

In an alternative embodiment to that shown in FIG. 12, only the information needed by the translation logic is shuffled from cycle to cycle. Hence, only the sign bits of the error terms are routed, not the error terms themselves. The history bits are recycled in the same manner as shown in FIG. 12. In this alternative embodiment, a two-bit pointer identifies the vector generator which computes the error term for the first pixel in the next processing cycle. The pointer's position changes from cycle to cycle depending upon the number of pixels generated and stored. Thus, the selection logic for the multiplexers is a function of both the desired pixel generation rate and the error term pointer. However, since the width of the routing multiplexer can be reduced when only the sign bits of the error terms are routed, the amount of hardware required to perform the function is reduced.

The decimal value of the two-bit pointer determines which vector generator calculates error term E0 in the next processing cycle. For example, if the pointer is set to 01 in binary (1 in decimal), vector generator number 1 computes error term E0 in the next cycle. Hence, the sign bit of the error term in vector generator number 1 is sent to the translation logic as S0, the sign bit for vector generator number 2 is sent as S1, the sign bit for vector generator number 3 is sent as S2, and the sign bit for vector generator number 0 is sent as S3. FIG. 14 shows which vector generator's sign bit is assigned to each of S0-S3, for various values of the pointer.

If not all of the pixels generated can be written into the frame buffer in a given cycle, the pointer value changes so as to indicate the new vector generator number which is used in the next cycle to calculate error term E0. For example, if the pointer equals 0 and only three pixels can be written, the next pointer value is 3. Furthermore, the current error term in register 168 of vector generator number 3 is not written over with the new value of the running error term for that vector generator. Therefore, during the next processing cycle, the old value of the error term for vector generator number 3 will be established as the new E0. In this manner, if an error term is not used in a particular cycle, then it is used in subsequent cycles. The effect on error term generation of storing less than four pixels in a given cycle, for the various values of the pointer, is shown in FIGS. 15(a)-(d), respectively.

The foregoing describes a system for generating more than one pixel location for a rasterized line in a given processing cycle. The method employed provides flexibility in that it can be generalized to simultaneously generate virtually any number of pixels per cycle. The pixel generation system can be adapted to generate a predetermined number of pixels during any particular machine cycle, and can even be configured so that the number of pixels generated is matched to the number that can be stored in the same cycle. The present invention provides a method for generating pixels in which the calculations involved are easily and quickly executed. In addition to providing high performance and relatively low hardware costs, the inventive pixel generation system resolves memory access conflicts during the same cycle as when the pixels are being generated. Additionally, the invention provides a means for recycling unstored data for storage in subsequent processing cycles, thereby obviating the need for additional hardware to act as a buffer for the unstored data values until they can be stored in later cycles.

While the invention has been described in detail herein in accord with certain preferred embodiments thereof, many modifications and changes therein may be effected by those skilled in the art. For example, while many of the Figures and the accompanying discussion describes a system for generating four pixels at a time, the method and apparatus of the invention may be utilized to simultaneously generate other numbers of pixels. Also, in some of the implementations described, the data values are passed from one stage to another by multiplexing the variables over several processing cycles. However, if additional hardware is employed, all of the data values to be passed from one stage to another can be sent in one processing cycle. Accordingly, it is intended by the appended claims to cover all such modifications and changes as fall within the true spirit and scope of the invention.

The invention claimed is:

1. A method for generating positioning values for a plurality of line points or pixels in a single machine cycle of a line generating system, wherein said positioning values represent the integer change in position relative to a previous pixel position necessary to represent an approximation of a linear function of at least one of the coordinates of said pixels, said method comprising:
generating error terms according to Bresenham's algorithm for each of a plurality of contiguous pixels, with the number of said contiguous pixels being equal to the number of pixels which are to be generated during said single machine cycle; and
generating, during said machine cycle, the positioning values for said plurality of pixels in a plurality of vector generators which are connected in parallel with one another and which are arranged so that each of said vector generators provides the positioning value for an associated one of said plurality of pixels, with the positioning value for each said pixel being determined, at least on part, as a function of the number of pixels being generated in one cycle and as a function of said error terms generated according to Bresenham's algorithm.

2. The method of claim 1 further comprising translating the positioning values provided by said vector generators into pixel position data which represents said approximation of said linear function.

3. The method of claim 1 further comprising storing in a memory device at least some of the positioning values generated during said single machine cycle.

4. The method of claim 3 wherein said storing step comprises storing during said machine cycle, those of the generated positioning values which meet the memory access constraints of the memory device, and regenerating unstored positioning values in subsequent machine cycles.

5. The method of claim 3 wherein said storing step comprises storing, during said machine cycle, those of the generated data values which meet the memory access constraints of the memory device, and designating the remaining generated data values for storage in subsequent machine cycles.

6. The method of claim 1 further comprising:
dividing a two dimensional grid of possible pixel coordinates into octants so that, for a first one of said octants, the change in pixel coordinates which represent said linear function in the second dimension are greater than or equal to zero and also less than or equal to the change in pixel coordinates in said first dimension which serves as the argument for said linear function; and
normalizing the parameters for said linear function so that the pixel coordinates for said function are contained in said first octant.

7. The method of claim 6 further comprising:
dividing said first octant into a plurality of regions, with the number of regions being equal to the number of pixels which are to be generated during said single machine cycle; and
determining, as a function of the sign of one or more of said error terms generated according to Bresenham's algorithm, which of said regions contains the pixel coordinates which represent said linear function.

8. The method of claim 7 wherein the determination of the positioning values for each said pixel is further a function of said region which contains said pixel coordinates.

9. A method for generating the x and y coordinates of multiple pixel locations for a parameter defined line to be rasterized during a given single machine cycle of the pixel generating system, wherein the number of said pixels to be generated in said cycle is designated by n, said method comprising:
dividing a two dimensional grid of possible pixel coordinates into octants so that, in a first one of said octants, the change in y-coordinate values of said parameter defined line is greater than or equal to zero and also less than or equal to the change in x-coordinate values thereof;
normalizing the parameters which define said line so that the pixel coordinates for said line are contained in said first octant;
dividing said first octant into a plurality of regions, with the number of regions being equal to n;
generating error terms for the first n pixel locations by applying Bresenham's algorithm to each of n contiguous pixels; and
generating in parallel, during said single machine cycle, n error terms which correspond to pixel locations other than said first n pixel locations, by adding a selectable increment to each of said error terms for said first n pixel locations, said increment having two possible values with the value selected being determined by the sign of the error term to which said increment is to be added.

10. The method of claim 9 further comprising determining, from the sign of one or more of said error terms for said first n pixel locations, which of said n regions contains the pixel coordinates for said rasterized line, and wherein the two possible values of said increment are determined as a function of said region which contains said rasterized line pixel coordinates.

11. The method of claim 10 wherein said two possible values of said increment are $2n(dy)-2(r+1)(dx)$ and $2n(dy)-2(r)(dx)$, for positive and negative signs, respectively, of the error term to which said increment is to be added, where r designates the region containing the rasterized line, dx designates the difference between the x-coordinate values of the ending and starting points of the line, and dy designates the difference between the y-coordinate values of the ending and starting points of the line.

12. The method of claim 10 wherein said values of said increment are determined during one or more of the machine cycles used to generate said error terms for said first n pixel locations.

13. The method of claim 9 further comprising translating the signs of the respective error terms into a sequence of binary bits which represent the incremental changes in the y-coordinate of the rasterized line pixel locations, as the rasterized line is traversed from its beginning coordinates to its ending coordinates.

14. The method of claim 13 wherein said binary bits are determined, at least in part, as a function of the binary bits previously appearing in said sequence, as a function of the region which contains said rasterized line pixel coordinates, and as a function of the limitations imposed on the sequence of bits for that region.

15. The method of claim 9 further comprising storing in a memory device having access rules at least some of the rasterized pixel locations generated in a given machine cycle, by determining which of said generated pixel locations meet the access rules of said memory device, storing said generated pixels which meet said rules in said device during said machine cycle, and regenerating in subsequent machine cycles those pixels which were not stored.

16. The method of claim 9 further comprising storing in a memory device having access rules at least some of the rasterized pixel locations generated in a given machine cycle, by determining which of said generated pixel locations meet the access rules of said memory device, storing said generated pixels which meet said rules in said device during said machine cycle, and designating for storage in subsequent machine cycles those pixels which were not stored.

17. Apparatus for generating positioning values for a plurality of pixels in a single given machine cycle of a pixel generating system, wherein said positioning values represent the integer change in position relative to a previous pixel position necessary to represent an approximation of a linear function of at least one of the coordinates of said pixels, said apparatus comprising:
means for generating error terms according to Bresenham's algorithm for each of a plurality of contiguous pixels, with the number of said contiguous pixels being equal to the number of pixels which are to be generated during said single machine cycle; and
a plurality of vector generators for generating, during said single machine cycle, the positioning values for said plurality of pixels, said vector generators being connected in parallel with one another and arranged so that each of said vector generators provides the positioning value for an associated one of said plurality of pixels, said vector generators being further configured so that the positioning value for each said pixel are determined, at least in part, as a function of the number of pixels being generated in one cycle and as a function of said error terms generated according to Bresenham's algorithm.

18. The apparatus of claim 17 further comprising means for translating the positioning values provided by said vector generators into pixel position data which represents said approximation of said linear function.

19. The apparatus of claim 17 further comprising means for storing at least some of the positioning values generated during said single machine cycle.

20. The apparatus of claim 19 wherein said storage means comprises means for storing, during said machine cycle, those of the generated positioning values which meet the memory access constraints of said storage means, and means for regenerating unstored positioning values in subsequent machine cycles.

21. The apparatus of claim 19 wherein said storage means comprises means for storing, during said machine cycle, those of the generated data values which meet the memory access constraints of said storage means, and means for designating unstored data values for storage in subsequent machine cycles.

22. The apparatus of claim 17 therein a two dimensional grid of possible pixel coordinates is divided into octants so that, for a first one of said octants, the change in pixel coordinates which represents said linear function in the second dimension are greater than or equal to zero but also less than or equal to the change in pixel coordinates which serve as the argument for said linear function in said first dimension, and further comprising means for normalizing the parameters for said linear function so that the pixel coordinates for said function are contained in said first octant.

23. The apparatus of claim 22 wherein said first octant is divided into a plurality of regions, with the number of regions being equal to the number of pixels which are to be generated during said single machine cycle, and further comprising means for determining, as a function of the sign of one or more of said error terms generated according to Bresenham's algorithm, which of said regions contains the pixel coordinates which represent said linear function.

24. The apparatus of claim 23 wherein said vector generators are further disposed so that the determination of the positioning values for each said pixel is further a function of said region which contains said pixel coordinates.

25. Apparatus for generating the x and y coordinates of multiple pixel locations for a parameter defined line to be rasterized during a given single machine cycle of the pixel generating system, wherein the number of said pixels to be generated in said cycle is designated by n and wherein a two dimensional grid of possible pixel coordinates is divided into octants so that, in a first one of said octants, the change in y-coordinate value of said parameter defined line is greater than or equal to zero and also less than or equal to the change in x-coordinate value thereof, said first octant being further divided into n regions, said apparatus comprising:
means for normalizing the parameters which define said line so that the pixel coordinates for said line are contained in said first octant;
means for generating error terms for the first n pixel locations by applying Bresenham's algorithm to each of n contiguous pixels; and
means for generating in parallel, during said single machine cycle, n error terms which correspond to pixel locations other than said first n pixel locations, said means being configured so that a selectable increment is added to each of said error terms for said first n pixel locations, said increment having two possible values with the value selected being determined by the sign of the error term to which said increment is to be added.

26. The apparatus of claim 25 further comprising means for determining, from the sign of one or more of said error terms for said first n pixel locations, which of said n regions contains the pixel coordinates for said rasterized line, and wherein the two possible values of said increment are determined as a function of said region which contains said rasterized line pixel coordinates.

27. The apparatus of claim 26 wherein said two possible values of said increment are $2n(dy)-2(r+1)(dx)$ and $2n(dy)-2(r)(dx)$, for positive and negative signs, respectively, of the error term to which said increment is to be added, where r designates the region containing the rasterized line, dx designates the difference between the x-coordinate values of the ending and starting points of the line, and dy designates the difference between the y-coordinate values of the ending and starting points of the line.

28. The apparatus of claim 26 wherein said means for generating error terms in parallel is further configured so that said values of said increment are determined during one or more of the machine cycles used to generate said error terms for said first n pixel locations.

29. The apparatus of claim 25 further comprising means for translating the signs of the respective error terms into a sequence of binary bits which represent the incremental changes in the y-coordinate of the rasterized line pixel locations, as the rasterized line is traversed from its beginning coordinates to its ending coordinates.

30. The apparatus of claim 29 wherein said translation means is further configured so that said binary bits are determined, at least in part, as a function of the binary bits previously appearing in said sequence, as a function of the region which contains said rasterized line coordinates, and as a function of the limitations imposed on the sequence of bits for that region.

31. The apparatus of claim 30 wherein said translation means comprises a combination of cascaded and Boolean logic elements.

32. The apparatus of claim 25 further comprising means for storing at least some of the rasterized pixel locations generated in a given machine cycle, said storage means having access means and including means for determining which of said generated pixel locations meet the access rules of said storage means during said machine cycle and means for regenerating in subsequent machine cycles those pixels which were not storable in said given machine cycle.

33. The apparatus of claim 25 further comprising means for storing at least some of the rasterized pixel locations generated in a given machine cycle, said storage means including means having access rules and for determining which of said generated pixel locations meet the access rules of said storage means during said machine cycle and means for designating for storage in subsequent machine cycles those pixels which were not storable in said given machine cycle.

* * * * *